J. MARCINKO.
DRIVING RUNNER FOR AUTOMOBILES.
APPLICATION FILED JUNE 13, 1917.
1,254,824.
Patented Jan. 29, 1918.
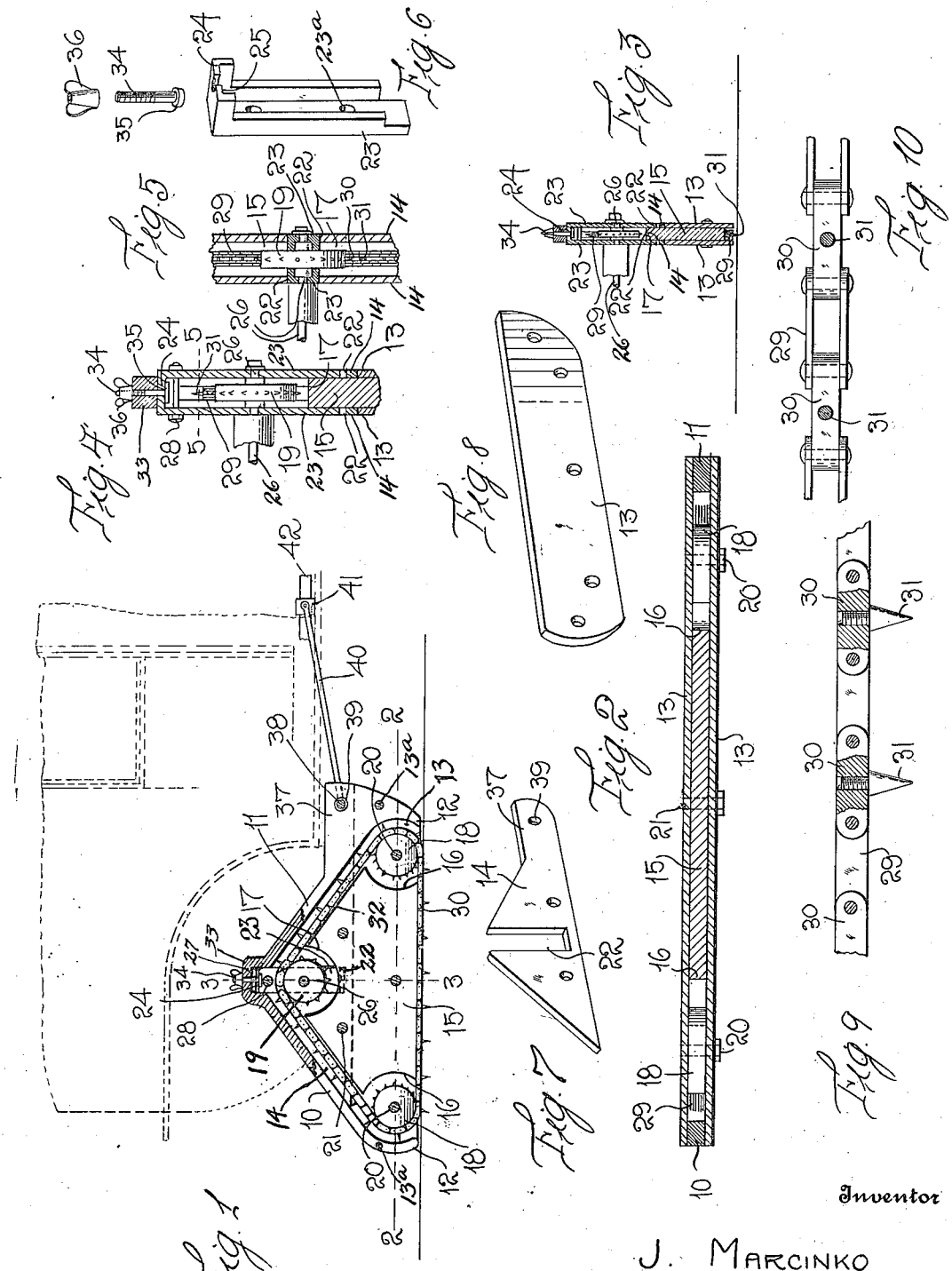
Inventor
J. MARCINKO
By Watson E. Coleman
Attorney

UNITED STATES PATENT OFFICE.

JOSSEF MARCINKO, OF CLEVELAND, OHIO.

DRIVING-RUNNER FOR AUTOMOBILES.

1,254,824.  Specification of Letters Patent.  Patented Jan. 29, 1918.

Application filed June 13, 1917. Serial No. 174,571.

*To all whom it may concern:*

Be it known that I, JOSSEF MARCINKO, a citizen of the United States, residing at Cleveland, in the county of Cuyahoga and State of Ohio, have invented certain new and useful Improvements in Driving-Runners for Automobiles, of which the following is a specification, reference being had to the accompanying drawings.

This invention relates to automobiles, and particularly to driving runners therefor, whereby the automobile may be driven through snow or over ice.

The general object of the invention is to provide a very simply constructed and easily operated runner in which a driving sprocket chain is used provided with calks and provide means whereby this driving sprocket chain may be operated from the driving axle of an automobile.

A further object is to provide means whereby the driving sprocket chain may be tightened as required from time to time.

A further object is to provide means whereby the runner may be held from rotary movement upon the axle.

Other objects will appear in the course of the following description.

My invention is illustrated in the accompanying drawings, wherein:—

Figure 1 is a side elevation of a motor car provided with my improved runner, the front plates of the runner being removed;

Fig. 2 is a longitudinal sectional view on the line 2—2 of Fig. 1;

Fig. 3 is a vertical sectional view on the line 3—3 of Fig. 1;

Fig. 4 is an enlarged fragmentary view on the same line as Fig. 3;

Fig. 5 is a horizontal sectional view on the line 5—5 of Fig. 4;

Fig. 6 is a perspective view of one of the members 23 and its coacting bolt and nut;

Fig. 7 is a perspective view of one of the plates 14;

Fig. 8 is a perspective view of one of the plates 13;

Fig. 9 is a sectional view of the driving chain; and

Fig. 10 is a fragmentary bottom plan view.

Referring to these drawings, it will be seen that the runner includes an approximately triangular frame formed by forward and rear upwardly converging integral frame bars 10 and 11, the lower end of each frame bar being inwardly curved as at 12, that is, curved toward each other. The upper ends of the bars are joined by an upwardly arched web 33 to define an upwardly extending recess 27 open at its lower end. Extending across the lower ends of the bars 10 and 11 and disposed on each side thereof are the lower plates 13 and disposed on each side of the frame formed by the bars 10 and 11 are the upper plates 14, these plates 13 and the plates 14 being attached to the frame bars 10 and 11 by bolts $13^a$ or in any other suitable manner. Disposed within the triangular space defined by the downwardly divergent triangular bars 10 and 11 and housed between the upper pair of plates 13 and the lower pair of plates 14 is a block 15 cut away at its ends as at 16. The block is approximately triangular in form and the apex of the triangle is cut-away as at 17. These cut-away portions of the block 15 provide for the two sprocket wheels 18 and the driving sprocket wheel 19.

The sprocket wheels 18 are mounted upon bearings 20, which may be in the form of bolts passing through the side plates 13, or may have any other suitable character. Bolts 21 pass through the block 15 and the side plates 13 and 14.

The side plates 14 are formed to conform to the shape of the members 10 and 11 and each of these side plates is provided with a downwardly extending slot 22. Operating within these slots 22 are vertically movable supporting members 23 forming a yoke to carry the driving sprocket wheel 19. Each of these supporting members is transversely channeled as illustrated in Fig. 6, and at its upper end each side wall of each supporting member is inwardly extended as at 24 and each of these supporting members has an upper wall 25. The driving shaft 26 of the automobile passes through suitable bearing openings $23^a$ in the members 23 and this shaft carries upon it the sprocket wheel 19. The upper end of the frame formed by the bars 10 and 11 is arched to provide a recess 27, and a bolt 28 passes through the supporting members 23 and into said recess 27 to hold the supporting members engaged with each other.

Passing around the sprocket wheels 18 and 19 is a sprocket chain 29 of any suitable construction, alternate links 30 of this sprocket chain being preferably made solid and formed with screw-threaded sockets for the reception of screw-threaded calks 31. By screw-threading the calks in these sockets, they may be readily removed and replaced when worn. The lower edge face of the block 15 guides the horizontal stretch of the sprocket chain 29, so that it moves parallel to the ground and is projected slightly below the inturned ends 12 of the bars 10 and 11. The upwardly extending flights of the sprocket chain bear against the end edges 32 of the block 15 and bear as closely against these ends as possible, so as to prevent snow or ice from being carried up to the sprocket wheel 19.

It is necessary, of course, to provide means whereby the sprocket chain may from time to time be tightened and to this end I provide the inturned upper end walls 25 previously referred to. The connecting web 33 of the bars 10 and 11 arches over the bolt 28 and passing vertically through this connecting web 33 is an adjusting bolt 34, the lower end of which carries a head 35, disposed beneath the inwardly turned flanges 25 of the members 23, the flanges 25 being perforated for the passage of this bolt. The bolt carries a wing nut 36 and thus by rotating the wing nut, the bolt 34 may be shifted up or down, thus raising or lowering the supporting frame and the driving sprocket wheel 19 relative to the sprocket wheels 18. By this means the chain may be tightened or slackened, as the necessities of the case require.

The member 11 of the frame is forwardly extended as at 37, as are the side plates 14 and a transverse rod 38 passes through an opening 39 in this extended portion of the rear runners. This rod 38 is connected at its opposite ends to braces 40, which may operatively engage the frame of the machine, or may be connected to a collar 41 surrounding but loose on the driving shaft 42 leading from the engine. The brace 40 holds the corresponding runner in line with the vehicle but does not prevent the runner from having a slight rotation in a vertical plane. It will be seen that the weight of the rear portion of the vehicle is carried by the axle 26 and is transmitted to the members 23 urging these members 23 downward relative to the runner. This downward pressure exerted upon the member 23 is transferred by means of the bolt 34 to the frame formed by the bars 10 and 11 and thus to the side plates 13 and 14 which with the frame constitute the runner.

The practical operation of this invention will be obvious from the drawings. A rotation of the shaft 26 will, of course, rotate the sprocket wheel 19 and thus the sprocket chain will be driven and form means for propelling the vehicle over ice or through snow. The construction is very simple, may be cheaply made, may be readily taken apart for repair or the replacement of parts, and is entirely effective for the purpose intended. It is particularly necessary to provide means for taking up the slack in the sprocket chain as otherwise, through wear, the sprocket chain becomes loose and, as a consequence, does not drive properly.

Having described my invention, what I claim is:—

1. A driving sled runner for motor vehicles open on its bottom and approximately triangular in form, forward and rear guiding sprocket wheels disposed within the runner adjacent its bottom, a driving sprocket wheel mounted in the upper portion of the runner for vertical movement, a driving sprocket chain passing over said sprocket wheels and provided with calks, and means for vertically shifting the driving sprocket wheel relatively to the body of the runner to thereby tighten the sprocket chain.

2. A driving sled runner for motor vehicles comprising a frame formed with downwardly divergent forward and rear portions, the apex of the frame being formed with an upwardly extending recess, plates secured to the frame on each side thereof, guiding sprocket wheels rotatably mounted in said plates adjacent the lower end of the runner, vertically disposed supporting members extending upward into said recess of the frame, a driving sprocket wheel rotatably mounted in said supporting members, and a screw passing through the top of the frame and operatively engaging the supporting members to thereby vertically adjust said supporting members and the sprocket wheel to tighten the sprocket chain, and a sprocket chain having calks passing around said sprocket wheels.

3. A driving sled runner for motor vehicles, open on its bottom, forward and rear guiding sprocket wheels disposed within the runner adjacent the bottom, a yoke mounted for vertical adjustment in the upper end of the runner, a driving sprocket wheel carried by said yoke, and a driving sprocket chain passing over the sprocket wheels and provided with calks.

4. A driving sled runner for motor vehicles comprising a frame having downwardly divergent forward and rear portions, the apex of the frame being formed with an upwardly extending recess, plates secured to the frame on each side thereof and formed with vertical slots extending downward from said recess, guiding sprocket wheels rotatably mounted in said plates adjacent the lower end of the runner, a yoke disposed in said slots and vertically adjustable therein, a driving sprocket wheel rotatably mounted in said yoke, and a screw passing through the top of the frame and operatively engaging said yoke to thereby vertically adjust said yoke and the driving sprocket wheel relatively to the guiding sprocket wheels to tighten the sprocket chains, and the sprocket chains having calks passing around said sprocket wheels.

In testimony whereof I hereunto affix my signature in the presence of two witnesses.

JOSSEF MARCINKO.

Witnesses:
F. B. WRIGHT,
M. R. WILSON.